United States Patent
Madej

(10) Patent No.: US 7,124,949 B2
(45) Date of Patent: Oct. 24, 2006

(54) REDUCING SPECKLE NOISE IN ELECTRO-OPTICAL READERS

(75) Inventor: Dariusz J. Madej, Shoreham, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/856,561

(22) Filed: May 28, 2004

(65) Prior Publication Data

US 2005/0011953 A1   Jan. 20, 2005

(51) Int. Cl.
*G06K 7/10* (2006.01)
(52) U.S. Cl. .............................. 235/462.16; 235/462.25
(58) Field of Classification Search ........... 235/462.16, 235/462.25, 462.26, 462.27, 462.29
See application file for complete search history.

(56) References Cited

U.S. PATENT DOCUMENTS

| | | | | |
|---|---|---|---|---|
| 5,481,269 | A | * | 1/1996 | Imhoff et al. .................. 342/90 |
| 5,619,998 | A | * | 4/1997 | Abdel-Malek et al. ...... 600/437 |
| 6,020,593 | A | * | 2/2000 | Chow et al. ................. 250/551 |
| 6,094,050 | A | | 7/2000 | Zaroubi et al. |
| 6,164,540 | A | * | 12/2000 | Bridgelall et al. ..... 235/462.01 |
| 6,565,003 | B1 | * | 5/2003 | Ma .......................... 235/462.1 |
| 6,758,401 | B1 | * | 7/2004 | Nopper .................. 235/462.29 |

FOREIGN PATENT DOCUMENTS

WO    WO 00/14633    3/2000

OTHER PUBLICATIONS

*Ideal Spatial Adaptation by Wavelet Shrinkage*, David L. Donoho, et al., Department of Statistics, Stanford University, STanford, CA, 94305, Jun. 1992, Revised Apr. 1993, pp. 1-40 (including 10 pages of drawings).
*Analysis of Speckle Noise in Bar-Code Scanning Systems*, Optical Society of America 2001, vol. 18, No. 4, Apr. 2001/ J. Opt. Soc. Am. A, Emanuel Marom, et al., pp. 1-14.
*Wavelet Based SAR Speckle Reduction and Image Compression*, J. E. Odegard, et al., Computational Mathematics Laboratory, Rice University, Houston, TX-77251, L. M. Novak, et al., MIT Lincoln Laboratory, Lexington, MA, 02173, Jun. 5, 1994, pp. 1-13.
*Reading, Printing, Specification, and Application of Bar Code and Other Machine Readable Symbols*, Roger C. Palmer, The Bar Code Book, Revised and Expanded, Symbologies, pp. 1-46.
*Novel Signal-Processing Techniques in Barcode Scanning*, Stephen J. Shellhammer, et al., IEEE Robotics & Automation Magazine, Mar. 1999, pp. 57-65.

* cited by examiner

*Primary Examiner*—Daniel Stcyr
(74) *Attorney, Agent, or Firm*—Kirschstein, et al.

(57) ABSTRACT

The influence of speckle noise in degrading performance of a reader for electro-optically reading a multiple element symbol is reduced by constructing wavelets for each element width, correlating each wavelet with a differentiated signal derived from light scattered from the symbol to obtain a correlated signal having peaks, each peak corresponding to a middle of a respective element, and processing the peaks to decode the symbol. Edge detection of the elements, which is susceptible to speckle noise degradation, is not used for decoding.

8 Claims, 4 Drawing Sheets

REDUCING SPECKLE NOISE IN ELECTRO-OPTICAL READERS

BACKGROUND OF THE INVENTION

1. Field of the Invention

The present invention generally relates to electro-optical readers for reading indicia such as bar code symbols and, more particularly, to reducing the deleterious effect of speckle noise in degrading reading performance.

2. Description of the Related Art

A moving beam electro-optical reader sweeps a laser beam over a scan across a bar code symbol, which is a graphic pattern of interleaving dark-colored bars separated by lighter-colored spaces of different light reflectivities and widths, as considered along a scan direction along which the beam is swept. Information is encoded in the widths of the bars and spaces. The symbol is typically printed on a record medium, for example, paper. A portion of the beam is scattered from the paper and is detected by a photodetector operative for converting the scattered light of variable intensity over the scan into an electrical analog signal which is conventionally processed by front-end electronics of the reader into an electrical digitized signal, and then stored in a memory for subsequent decoding. Once decoded, the information encoded in the symbol can be used for a myriad of purposes, e.g., retrieval from a host computer of data related to the decoded symbol.

Rather than using the analog signal directly to decode the symbol, the derivative of the analog signal is used, primarily to eliminate the effects of ambient light, to simplify signal voltage control, and to simplify edge detection. The derivative of the analog signal is depicted in FIG. 1 as a time domain function, where the X-axis is represented by sample numbers (although it is defacto time), and the Y-axis is represented by millivolts. The bar code signal is the result of a convolution of a bar code waveform and a laser beam profile, which is approximately a Gaussian function.

A typical bar code symbol decoding method comprises detecting the locations of peaks and valleys in the differentiated signal of FIG. 1 (each peak and valley corresponding to an "edge" or transition between a bar and a space in the symbol); measuring the distance between each peak and an adjacent valley (each such distance representing a "width" of a bar), or between each valley and its adjacent peak (each such distance representing a "width" of a space); and decoding the symbol by using the widths in accordance with predetermined symbology rules.

By way of example, FIG. 1 depicts a peak at t=6580, a valley at t=6620, and another peak at t=6700. Thus, a first bar width is 40, and a first space has a width of 80. These values can be normalized to 1× and 2×, and a sequence of bars and spaces might be recognized as a valid bar code pattern. Hence, a symbol can be successfully decoded only if all peaks and valleys are properly identified and accurately located.

In practice, however, the analog signal is corrupted by a wideband noise created by the electronics of the reader and by limited band speckle noise. Speckle noise is a problem in coherent imaging systems, such as electro-optical readers, when a spatially coherent laser beam is scattered from a rough surface of the paper on which the symbol is printed. Light scattering makes the phase values of the scattered light vary rapidly and create signal intensity variations. When the beam moves along the paper, the number of "speckles" in the field of view of the photodetector varies, thereby leading to random fluctuations in the current of the photodetector. Speckle noise is present even if no symbol is printed on the paper. A detailed analysis of speckle noise properties of a bar code reader can be found in an article by Marom and Kresic-Juric, entitled *"Analysis of Speckle Noise in Bar-Code Scanning Systems"*, J. Opt. Soc. Am. A, Vol. 18, No. 4, April 2001, pp. 888–901.

Speckle noise sometimes causes false peaks and valleys to appear in the differentiated signal of FIG. 1, sometimes causes real peaks and valleys to disappear, and sometimes shifts the locations of the real peaks and valleys, thus changing the widths of the bars and spaces and leading to erroneous reading or even failure to read. Speckle noise also limits miniaturization of the reader and limits the effectiveness of reading symbols with low contrast between the bars and the spaces.

Known filtering techniques, however, are less than satisfactory in removing speckle noise. Fourier domain filtering, i.e., low pass filtering or bandpass filtering, have proven ineffective. Also, averaging several signals is not effective, and neither is the use of non-linear median filters.

U.S. Pat. No. 5,302,813 discloses circuitry for detecting the presence of edges in a symbol and for measuring the strength of each detected edge. This eliminates some false peaks and valleys and, as good as this patented scheme is, it is not effective when peaks and valley are erased completely by speckle noise, or their location is severely affected by speckle noise.

In recent years, the theory of wavelet-based de-noising proposed by Donoho and Johnstone in an article entitled *"Ideal Spatial Adaptation by Wavelet Shrinkage"*, Dep. of Statistics, Stanford University, CA, June 1992, has received attention and was successfully used to filter colored (spectrum bounded) noise. In particular, such method was used to alleviate speckle noise in SAR radars, as described by J. E. Odegard, H. Guo, M. Lang, C. S. Burrus, and R. O. Welles, *"Wavelet Based SAR Speckle Reduction and Image Compression"*, Proc. of Symp. on OE/Aerospace Sensing and Dual Use Photonics, Orlando, Fla., April 1995, or ultrasound imaging systems, as described by A. Abdel-Malek and K. W. Rigby, *"Enhanced Method for Reducing Ultrasound Speckle Noise Using Wavelet Transform"*, U.S. Pat. No. 5,619,998.

However, in the above-mentioned systems, the goal was to use wavelets to filter out the speckles present in a two-dimensional image while preserving the sharp edges of the image. In the case of a bar code reader, the goal is to filter out the photodetector current noise and speckle noise from the bar code signal, and bar code elements, i.e., the bars and spaces, are not easily separable from such noise. Also, it is difficult to accurately measure element size. Moreover, the speed of the laser beam crossing the symbol varies, which results in variations of element size over the symbol. In addition, bar code elements are typically not printed with exactly the same size due to limited printer resolution. In order to accurately represent the sizes of elements of a symbol, there must be perfect synchronization of element size with the sampling rate and wavelet size, and this is difficult to achieve in practice.

SUMMARY OF THE INVENTION

Objects of the Invention

Accordingly, it is a general object of this invention to reduce the effects of speckle noise in electro-optical readers.

More particularly, it is an object of the present invention to improve decoding performance in such readers.

FEATURES OF THE INVENTION

In keeping with the above objects and others which will become apparent hereinafter, one feature of the present invention resides, briefly stated, in a method of decoding electro-optically readable symbols having elements of different light reflectivities and widths. For example, the symbol may be a bar code symbol having rectangular bars and spaces constituting the elements.

In a moving beam reader, a collimated laser beam is swept in a scan across the symbol to be read, and a photodetector detects light scattered from the symbol over a field of view and generates an analog signal corresponding to the symbol. The analog signal is typically differentiated to obtain a differentiated signal prior to decoding.

In accordance with this invention, the number of different element widths, and the average element widths, of the symbol is determined from the differentiated signal. As described below, if there are two average element widths, that indicates that a "binary code" such as Code 39 symbology was used for the symbol, and if there are four average element widths, that indicates that a "delta code" such as UPC symbology was used for the symbol.

Next, a wavelet is constructed for each average element width. Preferably, two spaced-apart Dirac delta functions of opposite polarity are convoluted with a Gaussian function (to simulate the laser beam cross-section) to obtain each wavelet.

Next, each wavelet is correlated with the differentiated signal to obtain a correlated signal having peaks. Each peak corresponds to a middle of a respective element, and not to an edge of an element. During such correlation, the respective wavelet and the differentiated signal are multiplied pointwise, and then the respective products are summed.

Next, the peaks are detected by peak detection. For example, this can be accomplished by differentiating the correlated signal and locating the zero crossings.

Next, false peaks are eliminated from the real peaks by a selection process which includes, but is not limited to, selecting the peak of highest amplitude of the correlated signal for each peak of the differentiated signal.

The remaining real peaks are used for decoding. For example, each real peak can be substituted by a noise-free wavelet to reconstruct the differentiated signal as a combination of wavelets.

The influence of speckle noise is reduced because the method involves processing peaks which correspond to the locations of the middle of each element, and not to the leading or trailing edges thereof which are more susceptible to corruption by speckle noise.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
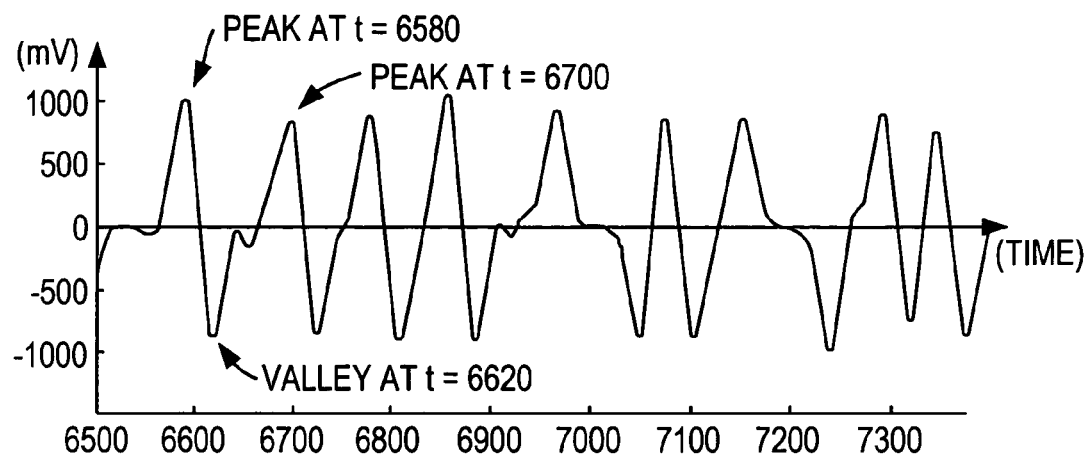
FIG. 1 is a graph of a differentiated signal derived from a bar code symbol read by an electro-optical reader in accordance with the prior art.

As previously mentioned, the electro-optical reading of indicia, such as a bar code symbol, includes acquiring an analog signal generated by a photodetector, differentiating the analog signal to obtain the differentiated signal of FIG. 1, processing the differentiated signal to obtain multibit data describing the symbol, and storing the data in a memory. U.S. Pat. No. 5,302,813, the entire contents of which are incorporated herein by reference thereto, describes this procedure.

Figure 2:
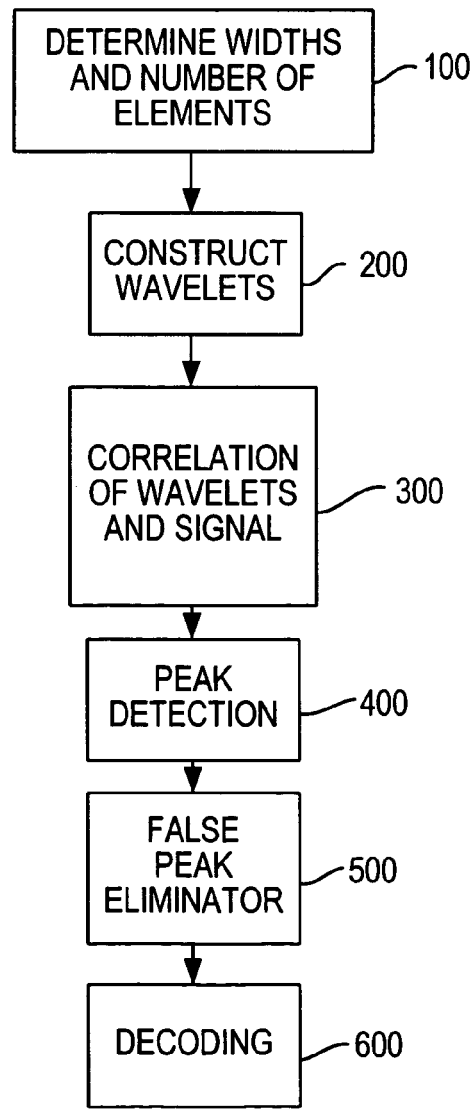
FIG. 2 is a block diagram of a method of reducing the effect of speckle noise in an electro-optical reader in accordance with this invention.

In accordance with this invention, the effects of speckle noise on degrading the differentiated signal are reduced by a method which includes a plurality of steps. As shown in FIG. 2, the first step 100 is to determine the widths of the elements of the symbol and the number of different widths employed by the symbol. For example, a Code 39 symbol employs symbol elements of only two widths, a Universal Product Code (UPC) symbol employs symbol elements of four widths, a Portable Data Format (PDF) 417 symbol employs symbol elements of six widths.

Step 100 advantageously comprises constructing a histogram of the differentiated signal in which the distances between successive edges, or element widths, is plotted in discrete intervals along the X-axis, and in which the number of occurrences of each element width or interval is plotted along the Y-axis. Preferably, the number of occurrences is weighted by a factor, which depends on the amplitude of the signal in the vicinity of the two edges. The number of element widths, e.g., 2, 4, or 6, determines the type of symbol, i.e., Code 39, UPC, or PDF 417, respectively. The average values of the element widths are calculated.

It is also possible to determine the average element widths independently of the bars and the spaces, thus solving a problem caused by a common bar code symbol printing error called bar width growth, in which the bars and spaces which, according to the symbol specification should have similar widths, have different widths due to printing imperfections. It is also possible to compensate for the change of observed element width across the bar code symbol due to varying speed on the laser beam or the perspective distortion.

By way of example, a Code 39 symbol might generate a set of two numbers 50 and 125. The 50 represents the average width of the narrow element, while the 125 represents the average width of the wide element. For a UPC symbol having only four element widths, step 100 might generate the numbers 20, 40, 60 and 80, thereby indicating normalized widths of 1N, 2N, 3N and 4N, respectively, where N is the width of the narrowest element.

Figure 3:
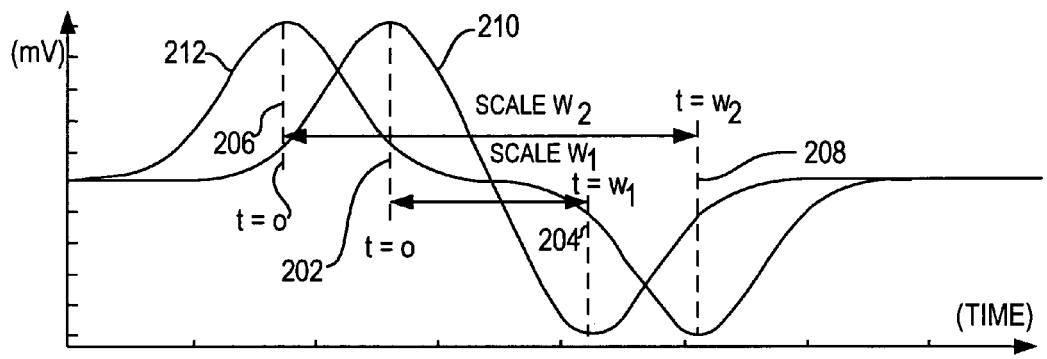
FIG. 3 is a plot of two wavelets of different scales constructed in accordance with the method of FIG. 2.

The next step 200 is to construct wavelet patterns for each of the element widths determined in step 100. In the case of a Code 39 symbol having two widths, the first width ($w_1$), e.g., number 50, is the horizontal distance between two Dirac delta functions 202, 204 of opposite polarity, and the second width ($w_2$), e.g., number 125, is the horizontal distance between two more Dirac delta functions 206, 208 of opposite polarity. Each delta function is an approximation of a tall, narrow spike function which has a value of infinity for t=0, a value of zero elsewhere, and a total integral of one. In FIG. 3, each delta function is depicted as a vertical dashed line. Delta functions 202, 206 are positive at t=0, and delta functions 204, 207 are negative at t=$w_1$ and t=$w_2$. Each width $w_1$ and $w_2$ is also known as the scale so that, in the FIG. 3 embodiment, scale $w_1$ represents the narrow element, and scale $w_2$ represents the wide element, of the symbol.

Next, the delta functions are convoluted with the Gaussian function which, as noted above, approximates the laser beam cross-section to obtain the wavelet 210 for scale $w_1$ and the wavelength 212 for scale $w_2$. The standard deviation of the Gaussian function is approximately the square root of the scale. During convolution, the functions are multiplied and shifted to obtain the wavelet. Mathematically speaking, each wavelet $\Psi$ is constructed as:

$$\Psi(s,t)=h_s(t)-h_s(t+\tau)$$

where $h_s$ (t) is the Gaussian function at scale s and $\tau$ is the scale. Such wavelet has a mean value of 0, and a finite energy, thereby fulfilling the wavelet admissibility condition. It is also possible to approximate the shape of the wavelet with quadratic splines.

Wavelets constructed in such a way can be used to match the shapes of the peaks and valleys of the differentiated signal as shown in correlation step 300. For instance, if a wavelet at scale $w_1$, is a good match for a fragment of the differentiated signal, then that fragment represents a narrow bar of the symbol. If a good match is obtained between a wavelet at scale $w_2$ and a fragment of the differentiated signal, then that fragment represents a wide bar. If we negate the wavelets 210, 212 of FIG. 3, then the inverted shapes can be used for best matches against narrow and wide spaces, respectively.

Figure 4:
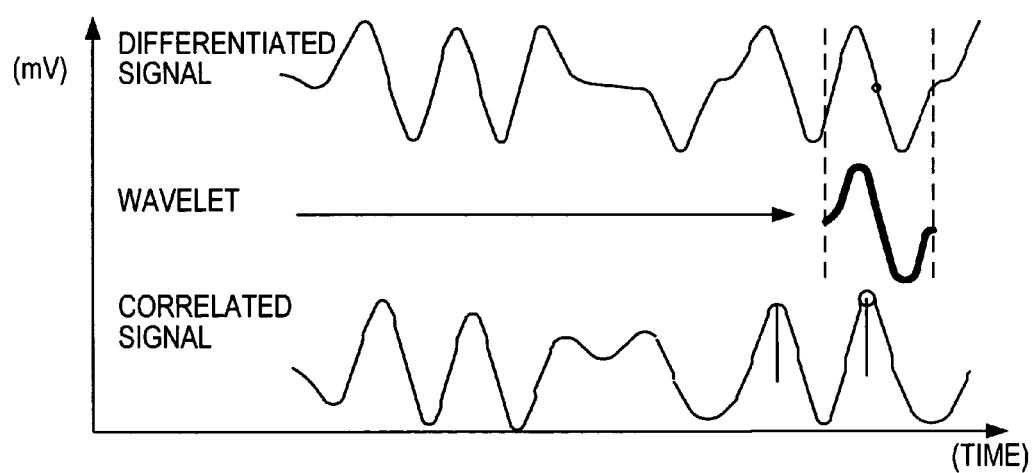
FIG. 4 is a plot of a set of three related waveforms produced during the method of FIG. 2.

The correlation step 300 is graphically shown in FIG. 4. The differentiated signal is the top waveform. A sample wavelet, e.g., 210 or 212, is the middle waveform. The correlated signal is the bottom waveform and is derived by multiplying the top and middle waveforms pointwise, and then summing the products. A correlated signal is obtained for each wavelet.

Figure 5:
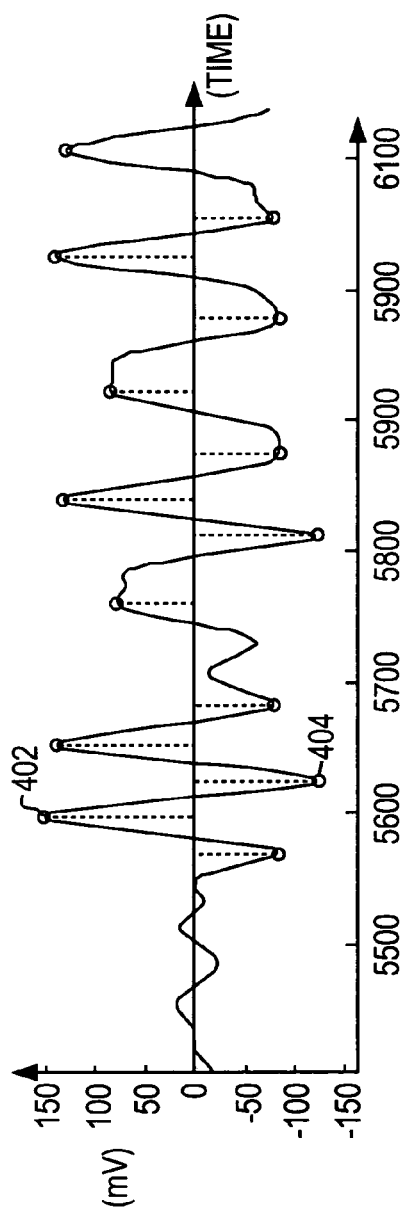
FIG. 5 is a graph of correlation coefficients plotted against a differentiated signal in accordance with the method of FIG. 2.

Step 400 performs a peak detection on each correlated signal. Preferably, the first derivative of each correlated signal is obtained, and the zero crossings represent the peaks. These peaks, also known as correlation coefficients, are plotted in FIG. 5 and represented by circles, e.g., 402, 404. The amplitude of each peak is on the Y-axis, and the position of each peak is on the X-axis. Each positive peak 402 represents the location of the middle of a bar. Each negative peak 404 represents the location of the middle of a space. It has been observed that speckle noise distorts the position of the middle of a bar or space less than the position of each leading or trailing edge of a bar or space. For that reason, using these peaks representing the middle of a symbol element for decoding renders the method of this invention more immune to speckle noise.

Thus, step 400 produces a set of correlation coefficients for each correlated signal. For a Code 39 symbol having symbol elements of only two widths, $w_1$ and $w_2$, two sets of correlation coefficients are produced, one for the narrow width $w_1$, and the other for the wide width $w_2$, and the results are plotted in FIG. 6 against the differentiated signal. It will be observed that at least one correlation coefficient, and preferably two correlation coefficients, are located adjacent each peak or valley of the differentiated signal.

Figure 6:
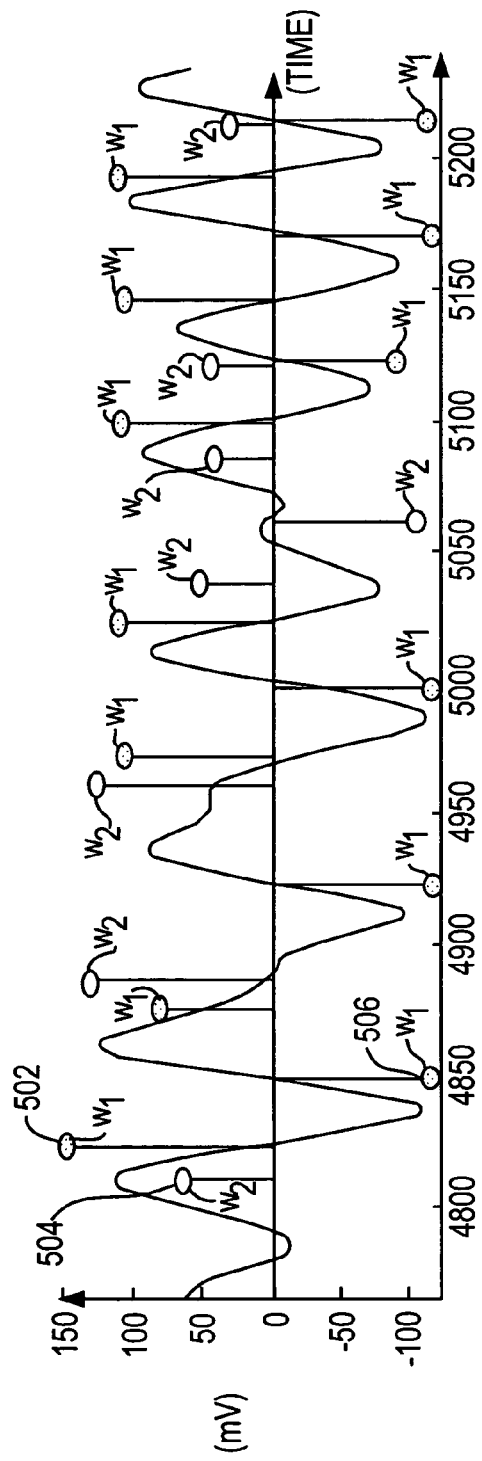
FIG. 6 is a graph of sets of the correlation coefficients of FIG. 5.

Step 500 is performed by eliminating false peaks in the plot of FIG. 6. Peaks having an amplitude greater than the amplitude of the peak of the differentiated signal are preferred, while others are eliminated. For example, peak 502 is preferred over peak 504 for the first peak of the signal. Peak 506 is preferred for the negative peak of the signal because there is no other. The result is a reduced set of correlation coefficients but with false peaks eliminated.

Figure 7:
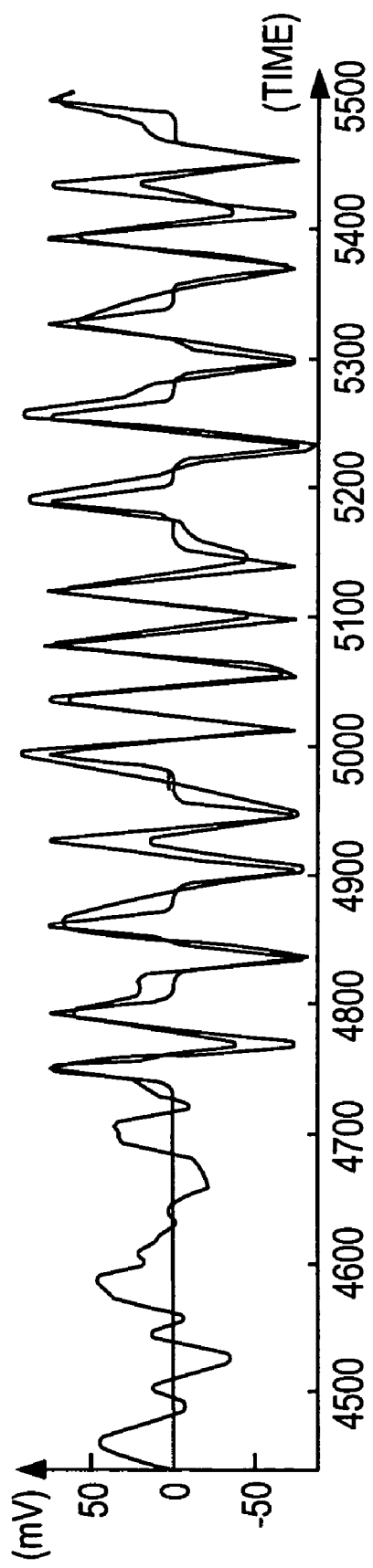
FIG. 7 is a depiction of a reconstructed signal compared to the differentiated signal produced in accordance with the method of FIG. 2.

Step 600 is performed by decoding the reduced set of correlation coefficients. In one decoding technique, a wavelet, such as 210 or 212, is substituted for each remaining correlation coefficient. A reconstructed signal representing the combination of all such substitutions is depicted in FIG. 7. The reconstructed signal is free from noise, because each wavelet is free from noise, and can be decoded in conventional manner.

Another decoding technique is performed directly with the correlation coefficients. For example, for each coefficient, one knows the location of the middle of a bar or a space. For a positive coefficient, one knows that the peak corresponds to a bar, and for a negative coefficient, a space. Also, one knows the width of each bar or space for each coefficient, thereby providing sufficient information to decode the symbol.

The advantage of the proposed method over the known decoding method is that wavelet coefficients are less likely to be corrupted by speckle noise than bar code edges are. A wavelet coefficient depends on correlation between a symbol pattern and a wavelet, and even if an edge is corrupted, then the wavelet coefficients are not severely affected.

The proposed wavelet de-noising method was tested using simulated and real bar code signals. Compared to other advanced decoding methods used in bar code scanners, for example, as described by S. Shellhammer, D. Goren, and T. Pavlidis, in *"Novel Signal-Processing Techniques in Barcode Scanning"*, IEEE Robotics and Automation Magazine, March 1999, pp. 57–65, the new method allows extending the scanner reading range by a factor of 1.25× to 1.75× in the case when decoding is limited by speckle noise, or it allows decoding bar codes, which were not decodable before. The proposed wavelet de-noising method allows for decoding bar code symbols with a signal-to-noise ratio lower by up to 10 dB.

It will be understood that each of the elements described above, or two or more together, also may find a useful application in other types of constructions differing from the types described above.

For example, the wavelet need not be correlated with the differentiated signal, but could be correlated with the analog or undifferentiated signal. In this event, the wavelet shape should be chosen so that the peaks of the correlated signal are still indicative of the middles of the respective elements.

While the invention has been illustrated and described as reducing speckle noise in electro-optical readers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of decoding electro-optically readable symbols having elements of different light reflectivities and widths, comprising the steps of:
   a) reflecting laser light off the elements to obtain an analog signal;
   b) constructing a wavelet for each element width by convoluting two spaced-apart Dirac delta functions by a Gaussian function to obtain the wavelet for each element width;
   c) correlating each wavelet with the analog signal to obtain a correlated signal having peaks, each peak corresponding to a middle of a respective element; and
   d) processing the peaks to decode a symbol with reduced influence from speckle noise.

2. The method of claim 1, and differentiating the analog signal to obtain a differentiated signal, wherein the correlating step is performed by multiplying each wavelet with the differentiated signal pointwise, and by detecting the peaks in the correlated signal for each element width.

3. The method of claim 1, and differentiating the analog signal to obtain a differentiated signal, and the steps of comparing the peaks with the differentiated signal, and of eliminating false peaks.

4. The method of claim 1, and the step of determining the widths of the elements prior to constructing each wavelet.

5. The method of claim 1, and the step of determining the number of different element widths present in the symbol.

6. The method of claim 1, and differentiating the analog signal to obtain a differentiated signal, wherein the processing step is performed by substituting the wavelet corresponding to each peak to form a combination of wavelets that reconstruct the differentiated signal.

7. A method of decoding electro-optically readable bar code symbols having bar elements and space elements of different light reflectivities and of different element widths, comprising the steps of:
   a) sweeping the symbol with a light beam in a scan across the symbol to scatter light therefrom, and detecting the light scattered from the symbol to generate an analog signal;
   b) differentiating the analog electrical signal derived from a symbol being read to obtain a differentiated signal;
   c) determining the number of different element widths present in the symbol to determine a symbology type to which the symbol belongs;
   d) determining the average element widths of the symbol;
   e) constructing a wavelet for each average element width by convoluting two spaced-apart Dirac delta functions of opposite polarity by a Gaussian function to obtain the wavelet for each average element width;
   f) correlating each wavelet with the differentiated signal to obtain a correlated signal having peaks, each peak corresponding to a middle of a respective element;
   g) detecting the peaks in the correlated signal for each average element width; and
   h) processing the peaks detected in the correlated signal to decode the symbol with reduced influence from speckle noise.

8. The method of claim 7, wherein the processing step is performed by substituting the wavelet corresponding to each peak to form a combination of wavelets that reconstruct the differentiated signal.

* * * * *